US009112907B2

(12) United States Patent
Krieger et al.

(10) Patent No.: US 9,112,907 B2
(45) Date of Patent: *Aug. 18, 2015

(54) SYSTEM AND METHOD FOR MANAGING TLS CONNECTIONS AMONG SEPARATE APPLICATIONS WITHIN A NETWORK OF COMPUTING SYSTEMS

(71) Applicant: International Business Machines Corporation, Armonk, NY (US)

(72) Inventors: Caspar G.J. Krieger, West Perth (AU); Bill J. Soper, West Perth (AU); Kenichi Yoshimura, West Perth (AU)

(73) Assignee: International Business Machines Corporation, Armonk, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/906,464

(22) Filed: May 31, 2013

(65) Prior Publication Data

US 2014/0359700 A1    Dec. 4, 2014

(51) Int. Cl.
*H04L 29/00*    (2006.01)
*H04L 29/06*    (2006.01)

(52) U.S. Cl.
CPC .................. *H04L 63/166* (2013.01)

(58) Field of Classification Search
CPC .................................................. H04L 63/166
See application file for complete search history.

(56) References Cited

U.S. PATENT DOCUMENTS

| 7,219,223 | B1 | 5/2007 | Bacchus et al. |
|---|---|---|---|
| 7,565,526 | B1 | 7/2009 | Shaw et al. |
| 7,574,600 | B2 | 8/2009 | Smith |
| 7,743,245 | B2 | 6/2010 | Khosravi |
| 7,992,200 | B2 | 8/2011 | Kuehr-McLaren et al. |
| 2002/0039420 | A1 | 4/2002 | Shacham et al. |
| 2003/0105951 | A1* | 6/2003 | Brabson et al. ............... 713/151 |

(Continued)

OTHER PUBLICATIONS

McVeety et al.; "Secure Channel Establishment in Disadvantaged Networks: TLS Optimization Using Intercepting Proxies"; Information Systems Technology Group—MIT Lincoln Laboratory; Lexington, MA; Aug. 18, 2009.
U.S. Appl. No. 13/915,755 entitled "System and Method for Managing TLS Connections among Separate Applications within a Network of Computer Systems" filed Jun. 12, 2013.
Pending U.S. Appl. No. 13/915,755, titled "System and Method for Managing TLS Connections Among Separate Applications Within a Network of Computing Systems," filed Jun. 12, 2013.

(Continued)

*Primary Examiner* — Brandon Hoffman
*Assistant Examiner* — Helai Salehi
(74) *Attorney, Agent, or Firm* — Arnold B. Bangali; Jeanine S. Ray

(57) ABSTRACT

An approach for reutilizing transport layer security (TLS) connections among separate application is provided. In one aspect, a computing system establishes a a transmission control program/Internet protocol (TCP/IP) connection between a first application of a first endpoint and a second application on a second endpoint. The computing system further performs a TLS handshake over the established TCP/IP connection. The computing system also transmits a request from a third application of the second endpoint to transfer a TLS context from the second application on the second endpoint. In response to the second application on the second endpoint accepting the transfer request, the second application utilizing via the one or more computer processors, a predetermined method of providing a TLS context to the third application, wherein the third application of the second endpoint and the first application of the first endpoint communicate securely.

13 Claims, 5 Drawing Sheets

(56) References Cited

U.S. PATENT DOCUMENTS

| | | |
|---|---|---|
| 2003/0105977 A1 | 6/2003 | Brabson et al. |
| 2006/0041938 A1 | 2/2006 | Ali |
| 2007/0226782 A1 * | 9/2007 | Sato et al. ............ 726/4 |
| 2012/0016977 A1 | 1/2012 | Robertson et al. |

OTHER PUBLICATIONS

The Internet Engineering Task Force (IETF), The Transport Layer Security (TLS) Protocol, Version 1.2, http://tools.ietf.org/html/rfc5246, Accessed on Mar. 6, 2015, pp. 1-104.

* cited by examiner

SYSTEM AND METHOD FOR MANAGING TLS CONNECTIONS AMONG SEPARATE APPLICATIONS WITHIN A NETWORK OF COMPUTING SYSTEMS

FIELD OF THE INVENTION

The present invention relates generally to network computer security, and more particularly to management of TLS connections among separate applications within a network of computer systems by reutilizing the (TLS) connections among the separate applications.

BACKGROUND

Transport Layer Security (TLS), as well as its predecessor, the Secure Sockets Layer (SSL), are cryptographic protocols that provide secure communications to internet protocols suites. Internet protocol suites, including, for example, transmission control program/Internet protocol (TCP/IP) are a set of communications protocols used for the Internet and similar networks. TCP is the protocol used by major Internet applications such as the World Wide Web, email, remote administration and file transfer. For instance, when an HTML file is sent to a client computer from a server computer, the TCP in the server computer divides the file into one or more packets, numbers the packets, and then forwards the packets individually to the IP. IP is responsible for maintaining a network connection between the client computer and the server computer. IP is also responsible for routing the one or more packets from the server computer to the client computer across a network security computing environment. For this purpose, IP defines the format of packets, and provides an addressing system for the format of the packets. The address system generally includes two functions: identifying hosts and providing a logical location service in the network computer environment.

SUMMARY

In one embodiment, a method for reutilizing transport layer security (TLS) connections among separate application within a computer system is provided. The method comprises, establishing, by one or more computer processors, a transmission control program/Internet protocol (TCP/IP) connection between a first application of a first endpoint and a second application on a second endpoint. The method further comprises, performing, by the one or more computer processors, a TLS handshake over the established TCP/IP connection, wherein the first application on the first endpoint and the second application on the second endpoint communicate securely. The method further comprises transmitting, by the one or more computer processors, a request from a third application of the second endpoint to transfer a TLS context to the second application on the second endpoint. The method further comprises, in response to the second application on the second endpoint accepting the transfer request, the second application utilizing via the one or more computer processors, a predetermined method of providing a TLS context to the third application, wherein the third application of the second endpoint and the first application of the first endpoint communicate securely.

In another embodiment, a computer system for reutilizing transport layer security (TLS) connections among separate application within a computer system is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to establish a transmission control program/Internet protocol (TCP/IP) connection between a first application of a first endpoint and a second application of a second endpoint. The computer program product further comprises program instructions to perform a TLS handshake over the established TCP/IP connection, wherein the first application of the first endpoint and the second application of the second endpoint communicate securely. The computer program product further comprises program instructions to transmit a request from a third application of the second endpoint to transfer a TLS context to the second application of the second endpoint. The computer program product further comprises program instructions to utilize a predetermined method of providing a TLS context to the third application, wherein the third application of the second endpoint and the first application of the first endpoint communicate securely, in response to the second application of the second endpoint accepting the transfer request.

In yet another embodiment, a computer program product system for reutilizing transport layer security (TLS) connections among separate application within a computer system is provided. The computer program product comprises one or more computer-readable tangible storage devices and program instructions stored on at least one of the one or more storage devices. The computer program product further comprises program instructions to establish a transmission control program/Internet protocol (TCP/IP) connection between a first application of a first endpoint and a second application of a second endpoint. The computer program product further program instructions to perform a TLS handshake over the established TCP/IP connection, wherein the first application of the first endpoint and the second application of the second endpoint communicate securely. The computer program product further comprises program instructions to transmit a request from a third application of the second endpoint to transfer a TLS context to the second application of the second endpoint. The computer program product further comprises program instructions to utilize a predetermined method of providing a TLS context to the third application, wherein the third application of the second endpoint and the first application of the first endpoint communicate securely, in response to the second application of the second endpoint accepting the transfer request.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein, like reference numerals indicate like components, and:

DETAILED DESCRIPTION

Embodiments of the present invention provide functionality for reutilizing transport layer security (TLS) connections among separate program applications within a network of client and server computing systems. TLS provides communication security for internet protocol suites including, for instance, transmission control protocol (TCP) and internet protocol (IP), which are commonly known as TCP/IP. According to one embodiment, a TCP/IP connection is established between program applications of two endpoints, including, clients and server computer systems. A TLS handshake occurs over the established TCP/IP connection, and once the TLS handshake is completed, all further communication will be transmitted over the TLS connection of the endpoints, causing it to be encrypted and decrypted using a cryptographic cipher decided upon during the TLS handshake, before it is transmitted over the underlying TCP/IP connection. For instance, the TLS handshake is a lockstep cryptographic handshake. Messages must be transmitted and received in a defined order, and any other order is an error. For example, during the TLS handshake process, TLS server and client computer systems perform peer authentication, including, for example, exchange of a set of encrypted/decrypted information or data of the TCP/IP connection.

Figure 1:
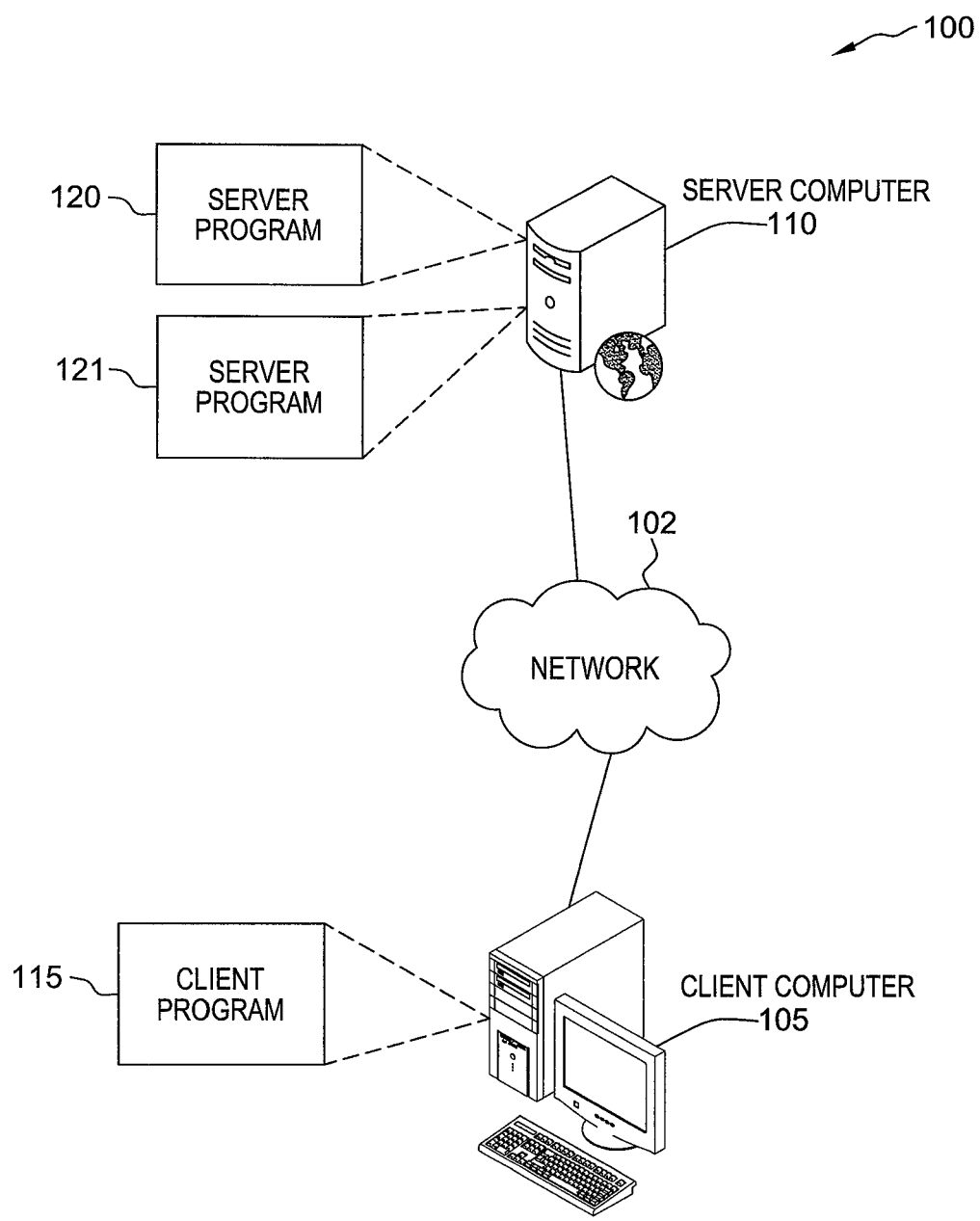
FIG. 1 is a functional block diagram of a network security computing environment in accordance with embodiments of the present invention.

The present invention will now be described in detail with reference to the accompanying drawings. Referring to FIG. 1, network security computing environment 100 for facilitating secure transfer of data communication within a network of client and server computing systems by reutilizing transport layer security (TLS) connections among separate program applications of the client and server computing systems is shown.

Network security computing environment 100 comprises network 102, client computer 105 and server computer 110. Client computer 105 and server computer 110 are interconnected over network 102. Client computer 105 includes, for example, a content browser such as a web browser which can be configured to establish a TLS session for end to end secure communications with, for example, a web server of server computer 110, as described below, in accordance with embodiments of the present invention.

Client computer 105 can be a laptop, tablet, or netbook personal computer (PC), a desktop computer, a mainframe or mini computer, a personal digital assistant (PDA), or a smart phone such as a Blackberry®. Client computer 105 includes client program 115. Client program 115 can be a web browser, a standalone web page search application, or part of a service that monitors and interacts with a web browser or web page search application with network security computing environment 100. Examples of web browsers include Internet Explorer® (Internet Explorer is a trademark of Microsoft Inc., in the United States, other countries or both), Firefox® (Firefox is a trademark of Mozilla Corporation, in the United States, other countries or both), Safari® (Safari is a trademark of Apple, Inc. in the United States, other countries or both) and Google Chrome™ (Google Chrome is a trademark of Google, Inc. in the United States, other countries or both). Server computer 110 can be a web server, or any other electronic device or computer capable of receiving and sending data.

Server computer 110 can also represent a "cloud" of computers interconnected by one or more networks, where server computer 110 can be a primary server for a computing system utilizing clustered computers when accessed through network 102 within network security computing environment 100. Server computer 110 includes server programs 120, 121. Server programs 120, 121 are software programs that reside on server computer 110. Embodiments of the present invention utilize server program 120 and 121 using the same endpoint, for example, server computer 110. Server programs 120, 121 could be on separate endpoints of server computers within network security computing environment 100, in accordance with embodiments of the present invention. For instance, server computer 110 is an endpoint for requests for content that are issued by client computer 105. Client computer 105 can also be considered an endpoint within network security computing environment 100. Hence, in this manner, the TLS communication session of network security computing environment 100 can exist between client computer 105 and server computer 110.

The TLS communication session is end to end communication between client computer 105 and server computer 110. TLS is used herein as an example of a secure communication protocol utilized to encrypt segments of network connections at the transport layer end to end connections between client computer 105 and server computer 110. Embodiments of the present invention described herein may use any type of protocol that provides security for communications within network computing security environment 100.

According to one embodiment of the present invention, transmission control program/internet protocol TCP/IP connection is established between client program 115 and server program 120. Furthermore, once the TCP/IP connection is established between client program 115 and server program 120, all further communication between client program 115 and server program 120 is transmitted over the TLS connection of TCP/IP, causing the communication to be encrypted and decrypted using a cryptographic cipher decided upon during the TLS handshake procedure of the established TLS connection. The state of information of establishing the TCP/IP connection between client program 115 and server program 120 can be collectively referred to as a TLS context, and the TLS context is maintained by both client program 115 and server program 120 in order to transfer information between client computer 105 and server computer 110. Ordinarily, the TLS handshake procedure is time consuming, and must be performed for each TCP/IP socket of both client computer 105 and server computer 115 for which TLS encryption is required, resulting in decreased performance for designs which rely on TLS sockets, including, for example TLS sockets of the client computer 105 and the server computer 110. TLS provides a mechanism to resume previous TLS sessions on new TCP/IP sockets of client computer 105 or server computer 105, thus allowing part of the handshake procedure to be skipped by partly reusing the information exchanged in the initial handshake, but resuming a TLS session requires both client program 115 client computer and server computer 120 to maintain the TLS context, which is not always possible. For example, a z/OS® (z/OS is a trademark of International Business Machines in the United States, other countries, or both) environment, when a new address space is created, including another program application, for instance, server program 121, the TLS context cannot be carried over to the new program application of the computing system, including, for example, server computer 110.

Exemplary embodiments of the present invention allows program applications, including for instance, server program 120 to transfer the TLS context to server program 121, as described below, in accordance with embodiments of the present invention.

Figure 2:
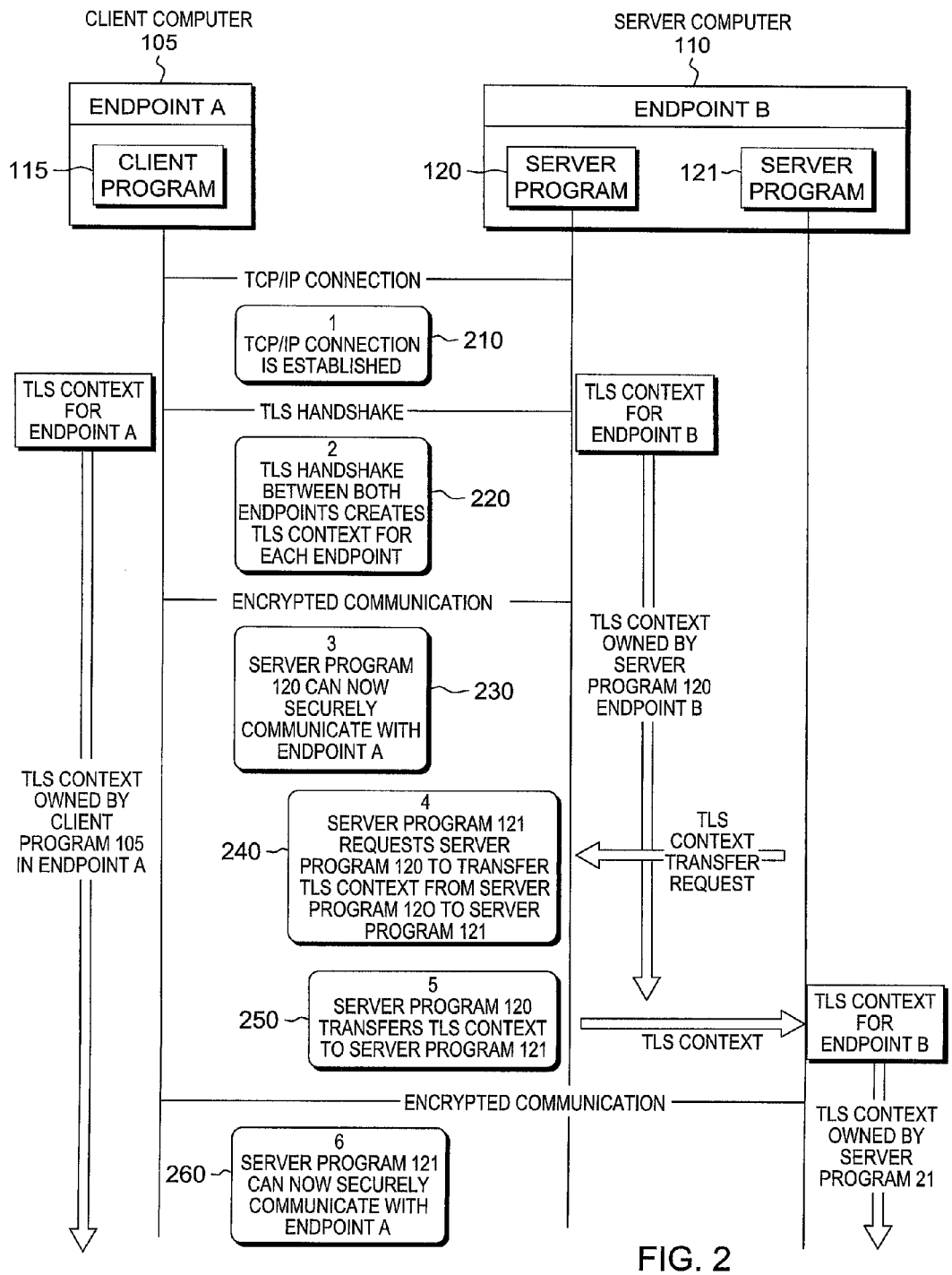
FIG. 2 is a message flow diagram illustrating transmission of communication for reutilizing transport layer security (TLS) connections between a client computer and a server computer within a network security computing environment, in accordance with embodiments of the present invention.

The present invention thus allows the receiving program, for example, server program 121 to resume TLS handshake which were initially created by a sending application, for example, server program 120, thereby avoiding a performance overhead of doing another TLS handshake for program applications of server computer 110, as described in FIG. 2, in accordance with embodiments of the present invention.

FIG. 2 is a message flow diagram illustrating transmission of communication for reutilizing transport layer security (TLS) connections among client program 115 of client computer 105 and server programs 120, 121 of server computer 110 within network security computing environment 100. TCP/IP connection is established between client program 115 on client computer 105 and server program 120 on server computer 110 (Message Flow 210).

According to one aspect, client computer 105 and server computer 110 could be endpoints. The endpoint establishes, and communicates over TCP/IP network connections, via network 102, between communication process of client program 115 and server programs 120, 121. Once the TCP/IP connection is established between client computer 105 and server computer 110, the two can communicate with each other by reading and writing to the TCP/IP connection. A TLS handshake occurs between both endpoints, for example, client computer 105 and server computer 110, thus creating a TLS context for the client program 115 and server program 120. As described, the state of information of establishing the TLS connection between client program 115 and server program 120 can be collectively referred to as a TLS context, and the TLS context is maintained by both client program 115 and server program 120 in order to transfer information between program applications of client computer 105 and server computer 110, in accordance with embodiments of the present invention. (Message flow 220).

For example, TLS handshake involves both client computer 105 and sever computer 110 communicating their public keys to each other, typically bundled with associated identifying information in the form of a certificate, using each other's public key to communicate and agree upon a shared communication secret, and then using that shared communication secret to encrypt their remaining communication. Once the identification of information in the certification form process is completed, the TLS handshake is completed, and the TLS connection between client computer 105 and server computer 110 is established. Moreover, the transmission of communication between client computer 105 and server computer 110 during the TLS handshake occurs over an existing TCP/IP connection, as described in FIG. 3. Once the TLS handshake procedure is completed, server program 120 can now securely communicate with client program 115. (Message flow 230).

Moreover, once a TCP/IP connection is established between client program 115 and server program 120, server program 121 requests a transfer of the TLS context from server program 120 to server program 121. (Message Flow 240). This request may be transmitted over any communication medium. The request of server program 121 to server program 120 indicates desire of server program 121 to transfer ownership of the TLS context, including, for example, ownership of the TLS connection between server program 120 on server computer 110 and client program 115 on client computer 105. For example, server program 121 may need to urgently communicate with client program 115 to warn of an impeding system failure, and the request of server program 121 to server program 120 could occur via a previously agreed upon method, such as, for example, sending an interrupt to server program 120.

For instance, server program 120 may choose to accept the transfer request or deny the request. If the request is denied, nothing further happens. If server program 120 chooses to accept the transfer request, server program 120 uses a preagreed or predetermined method to provide the TLS context to server program 121. For example, server program 120 may write the details to a file which server program 121 then reads from. (Message flow 250). According to one embodiment of the present invention, once server program 120 transfers the TLS context to server program 121, at message flow 250, server program 121 can now securely communicate with client program 115. (Message flow 260).

Figure 3:
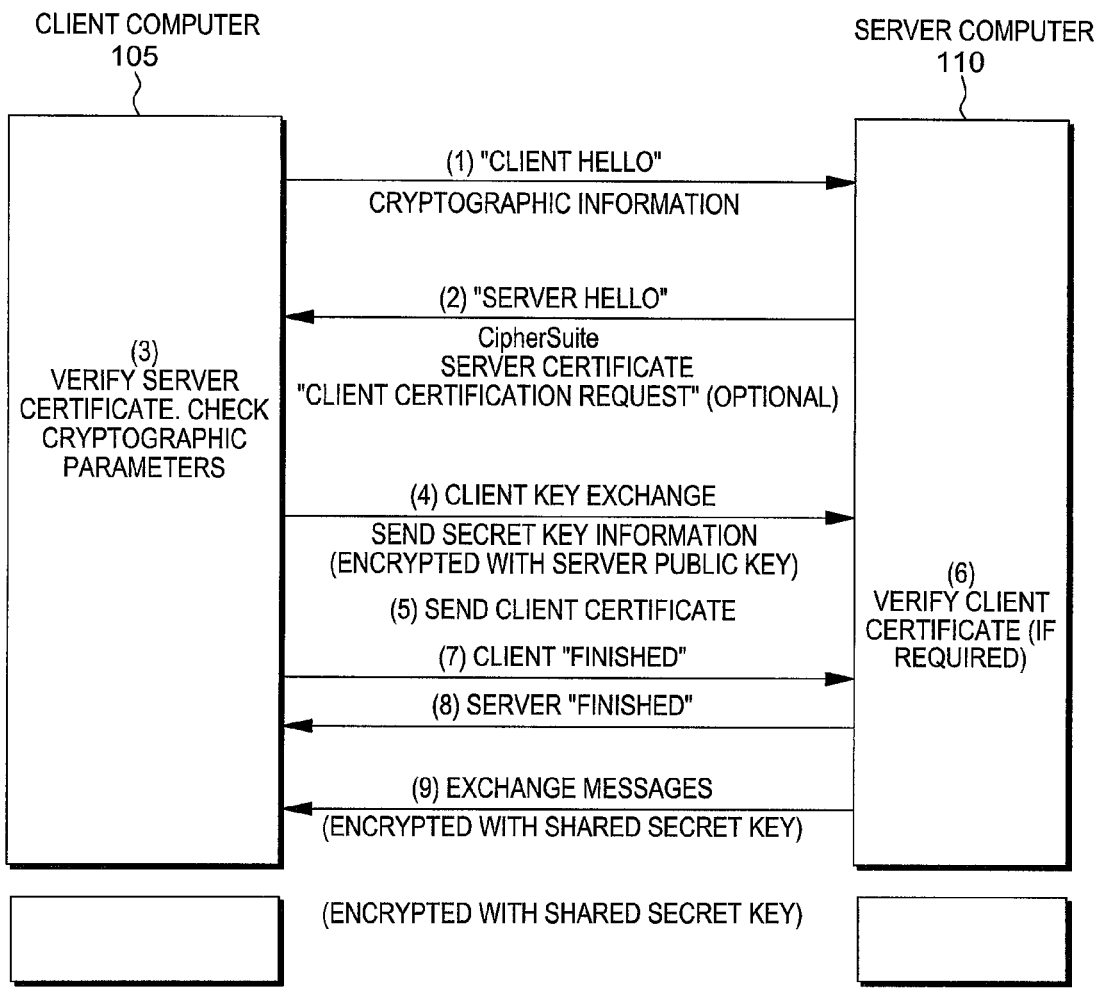
FIG. 3 is a functional diagram illustrating steps performed by a client computer and a server computer to establish a TLS handshake to create a TLS context for the client computer and the server computer, in accordance with embodiments of the present invention.

FIG. 3 is a functional diagram illustrating steps performed by client program and server program to establish a TLS handshake to create a TLS context for each endpoint, including client computer and server computer. According to one embodiment, TLS handshake enables client computer and server computer to establish secret keys with which they communicate within the TLS connection. Client program 115 transmits a "client hello" message that lists cryptographic information of the TLS connection, including, for example, a version of a TLS protocol that is utilized during the TLS handshake procedure (Step 1). Server program 120 responds to the "client hello" message with a "server hello" message. (Step 2). The "server hello" message includes a ciperherSuite chosen by server program 120 from a list provided by client program 115 and a session ID.

Client program 115 verifies a digital certificate of server program 120 of the "server hello" message. (Step 3). Client program 115 transmits a key exchange to server program 120. The key exchange includes transmission of public keys between client program 115 and server program 120, for instance, client program 115 transmits a random byte string that enables both client program 115 and server program 120 to compute a secret key to be used for encrypting subsequent message information. (Step 4). Client program 115 transmits a certificate request to server program 120 (Step 5). Server program 120 verifies the transmitted certificate request. (Step 6). Client program 115 transmits a "finished" message to server program 120, which is encrypted with the secret key, indicating client program 115 of client computer 105 completed the handshake. (Step 7). Server program 120 transmits to client program 115 a "finished" message, which is encrypted with the secret key, indicating that server program 120 completed the TLS handshake procedure. (Step 8). Client computer 105 and server computer 110 completed the TLS handshake procedure, hence, all communication between client computer 105 and server computer 110 will be transmitted over TLS connection. (Step 9).

Figure 4:
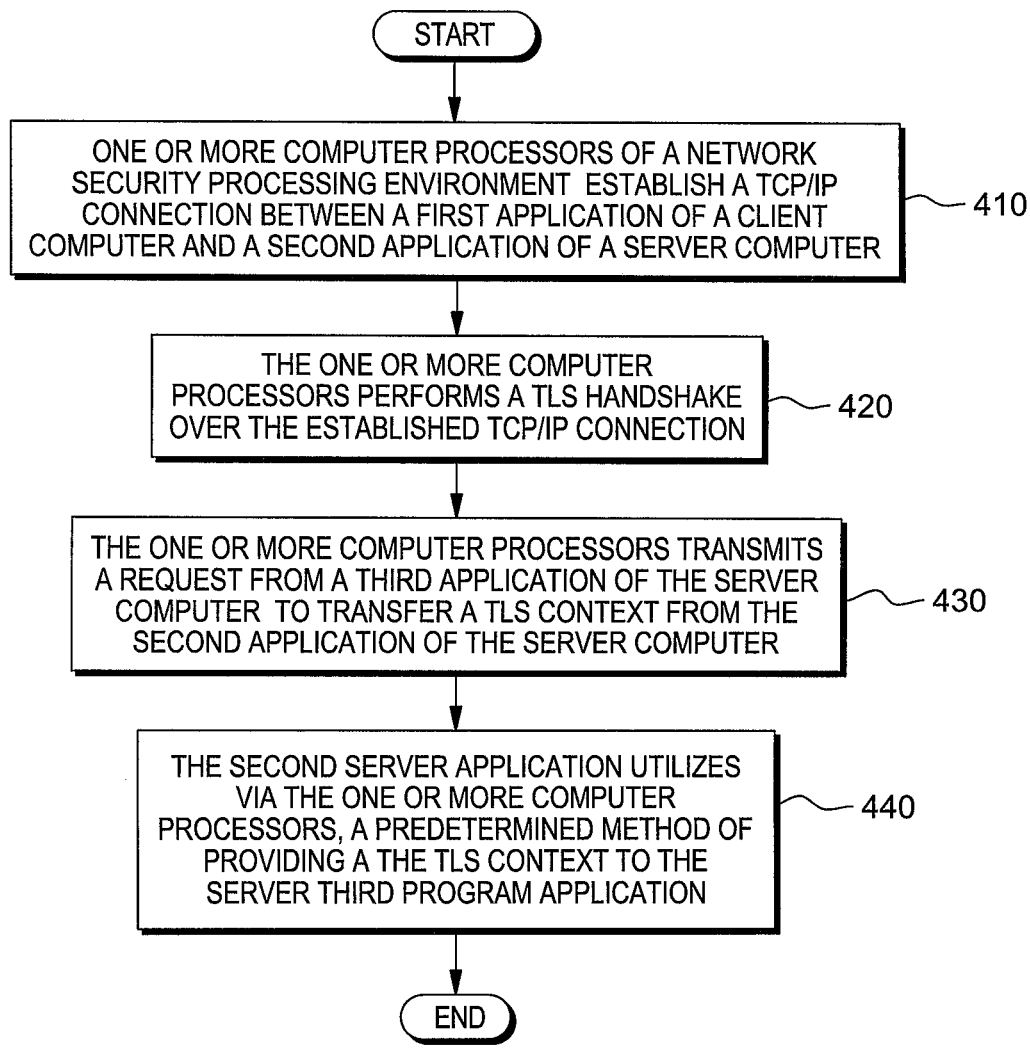
FIG. 4 is a flowchart depicting step performed by one or more computer processors of a client computer and a server computer within a network security computing environment, in accordance with embodiments of the present invention.

FIG. 4 is a flowchart depicting steps performed by one or more computer processors of network security processing environment 100, in accordance with embodiments of the present invention. One or more computer processors of network security processing environment 100 establishes a transmission control program/Internet protocol (TCP/IP) connection between client program 115 and server program 120. (Step 410). The one or more computer processors performs a TLS handshake over the established TCP/IP connection, wherein client program 115 and server program 120 communicate securely. (Step 420). The one or more computer processors transmits a request from server program 121 to server program 120 for a transfer of a TLS context to server program 121. (Step 430). In response to server program 120 accepting the transfer request, server program 120 utilizes via the one or more computer processors, a predetermined method of providing a TLS context to server program 121, wherein the server program 121 and client program 115 of client computer 105 communicate securely. (Step 440).

Figure 5:
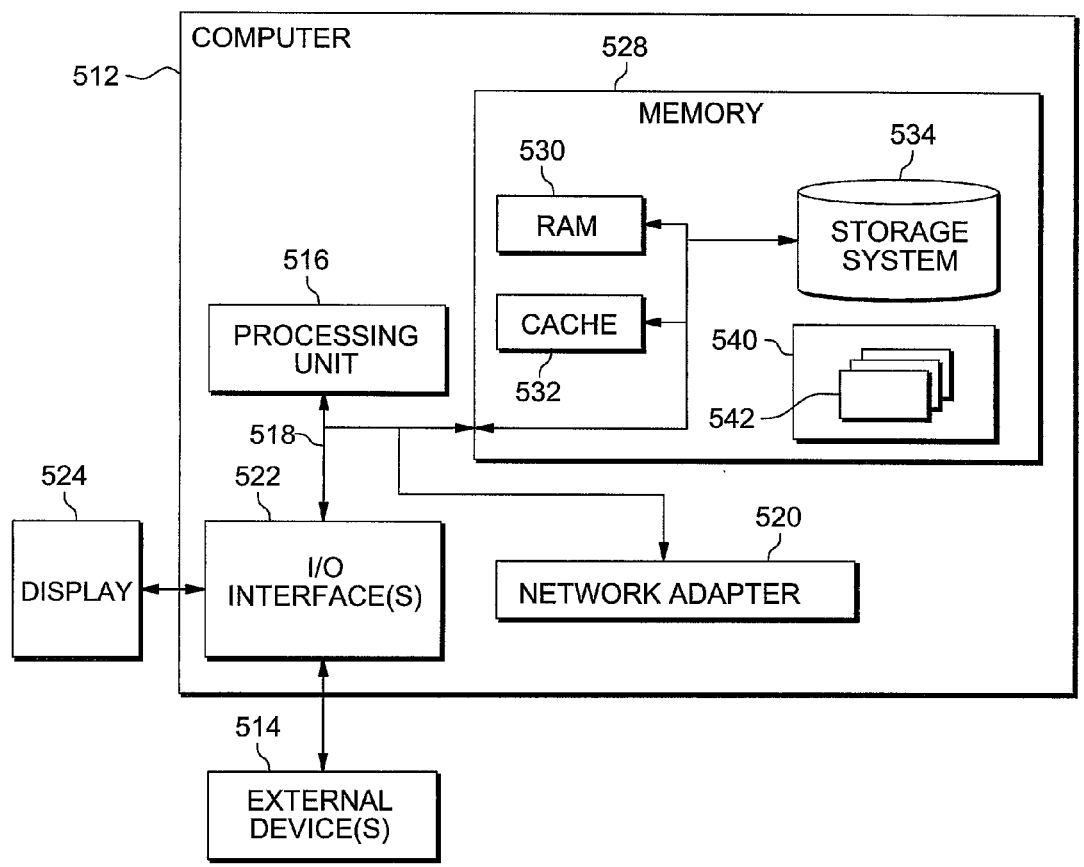
FIG. 5 illustrates a block diagram of components of a computer system in accordance with embodiments of the present invention.

FIG. 5 is a functional block diagram of a computer system, in accordance with an embodiment of the present invention.

Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Client computer 105 and server computer 110 can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media.

Memory 528 includes computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Client program 115 and server programs 120, 121 can be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Each one of client program 115 and server programs 120, 121 can be implemented as an instance of program 540.

Computer 512 may also communicate with one or more external devices 514 such as a keyboard, a pointing device, etc., as well as display 524; one or more devices that enable a user to interact with computer 512; and/or any devices (e.g., network card, modem, etc.) that enable computer 512 to communicate with one or more other computing devices. Such communication occurs via Input/Output (I/O) interfaces 522. Still yet, computer 512 communicates with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for reutilizing transport layer security (TLS) connections among separate applications within a computer system have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer system for reutilizing transport layer security (TLS) connections among separate application within a computer system, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to establish a transmission control program/Internet protocol (TCP/IP) connection between a first application of a first endpoint and a second application of a second endpoint, wherein the secured communication is based on transmission of public keys during the TLS handshake and, wherein the transmitted public keys comprise shared encrypted communication that is transmitted between the first application and the second application;

program instructions to perform a TLS handshake over the established TCP/IP connection, wherein the first application of the first endpoint and the second application of the second endpoint communicate securely, wherein the secured communication is based on transmission of public keys during the TLS handshake and, wherein the transmitted public keys comprise shared encrypted communication that is transmitted between the first application and the second application;

program instructions to transmit a request from a third application of the second endpoint to transfer a TLS context from the second application of the second endpoint, the request of the third application occurs via a previously agreed shared network connection of the TLS handshake; and program instructions to utilize a predetermined method of providing a TLS context to the third application, wherein the third application of the second endpoint and the first application of the first endpoint communicate securely, in response to the second application of the second endpoint accepting the transfer request, wherein the third application of the second endpoint resumes the TLS handshake between the first application on the first endpoint and the second application on the second endpoint, the resumed handshake avoids system performance redundancy of performing another TLS handshake between the first application on the first endpoint and the second application on the second endpoint.

2. The computer system according to claim 1, wherein a TLS connection provides communication security for internet protocol suites including TCP/IP, wherein the TCP/IP is a secure connection that is established between the first application and the second application, and wherein TCP/IP provides connectivity that specifies how information should be formatted, addressed, transmitted, routed or received between the first end point and the second endpoint.

3. The computer system according to claim 1, wherein once the TLS handshake is completed, communications are transmitted over a TLS connection of the TCP/IP of the first endpoint and the second endpoint, causing the communications to be encrypted before and decrypted after the communications are transmitted over the TCP/IP connection of the first endpoint and the second endpoint.

4. The computer system according to claim 1, wherein the TLS handshake includes the first endpoint and the second endpoint communicating public keys to communicate and agree upon a shared network connection, and then using the shared network connection to encrypt communication of the first endpoint and the second endpoint.

5. The computer system according to claim 1, wherein the request to from a third application of the second endpoint to transfer a TLS context to the second application on the second endpoint indicates an intent of the third application to transfer ownership of the TLS context to the third application on the second endpoint.

6. The computer system according to claim 5, wherein the second application on the second endpoint may accept or deny the request from the third application of the second endpoint.

7. The computer system according to claim 5, wherein communication from the third application of the second endpoint and the second application on the second endpoint occurs through a previously agreed method of communication to provide the TLS context to the third application of the second endpoint.

8. A computer program product for reutilizing transport layer security (TLS) connections among separate application within a computer system, the computer system comprising:
one or more computer-readable tangible storage devices and program instructions stored on at least one of the one or more storage devices, the program instructions comprising:
program instructions to establish a transmission control program/Internet protocol (TCP/IP) connection between a first application of a first endpoint and a second application of a second endpoint, wherein the secured communication is based on transmission of public keys during the TLS handshake and, wherein the transmitted public keys comprise shared encrypted communication that is transmitted between the first application and the second application;
program instructions to perform a TLS handshake over the established TCP/IP connection, wherein the first application of the first endpoint and the second application of the second endpoint communicate securely, wherein the secured communication is based on transmission of public keys during the TLS handshake and, wherein the transmitted public keys comprise shared encrypted communication that is transmitted between the first application and the second application;
program instructions to transmit a request from a third application of the second endpoint to transfer a TLS context from the second application of the second endpoint, the request of the third application occurs via a previously agreed shared network connection of the TLS handshake; and
program instructions to utilize a predetermined method of providing a TLS context to the third application, wherein the third application of the second endpoint and the first application of the first endpoint communicate securely, in response to the second application of the second endpoint accepting the transfer request, wherein the third application of the second endpoint resumes the TLS handshake between the first application on the first endpoint and the second application on the second endpoint, the resumed handshake avoids system performance redundancy of performing another TLS handshake between the first application on the first endpoint and the second application on the second endpoint.

9. The computer program product according to claim 8, wherein once the TLS handshake is completed, communications are transmitted over a TLS connection of the TCP/IP of the first endpoint and the second endpoint, causing the communications to be encrypted before and decrypted after the communications are transmitted over the TCP/IP connection of the first endpoint and the second endpoint.

10. The computer program product according to claim 8, wherein the TLS handshake includes the first endpoint and the second endpoint communicating public keys to communicate and agree upon a shared network connection, and then using the shared network connection to encrypt communication of the first endpoint and the second endpoint.

11. The computer program product according to claim 8, wherein the request to from a third application of the second endpoint to transfer a TLS context to the second application on the second endpoint indicates an intent of the third application to transfer ownership of the TLS context to the third application on the second endpoint.

12. The computer program product according to claim 11, wherein the second application on the second endpoint may accept or deny the request from the third application of the second endpoint.

13. The computer program product according to claim 11, wherein communication from the third application of the second endpoint and the second application on the second endpoint occurs through a previously agreed method of communication to provide TLS context to the third application of the second endpoint.

* * * * *